Jan. 1, 1946.  D. T. DOWNES  2,392,129
LAMINATED GLASS CLOSURE UNIT
Filed April 23, 1943
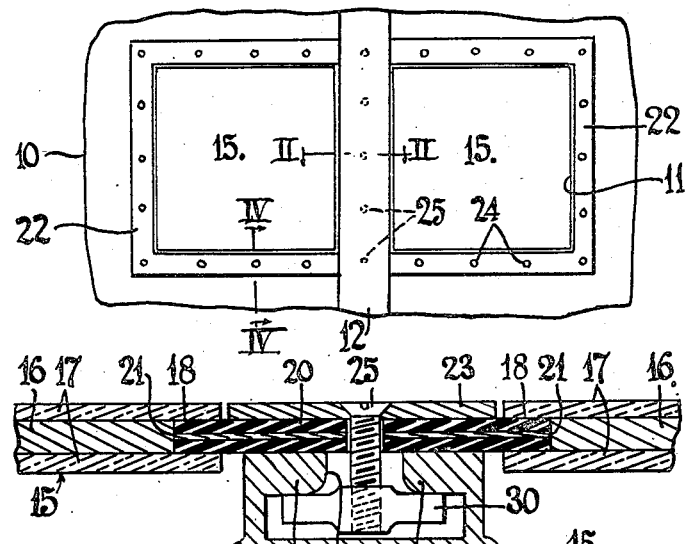
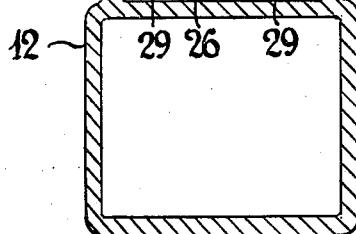
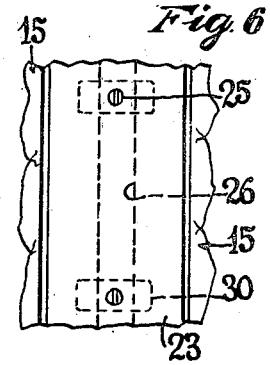
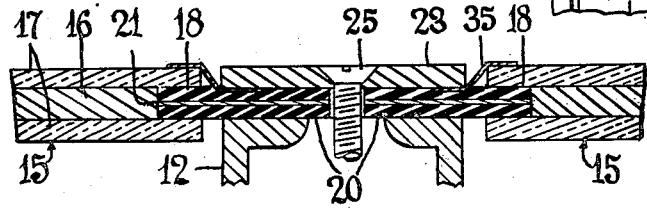
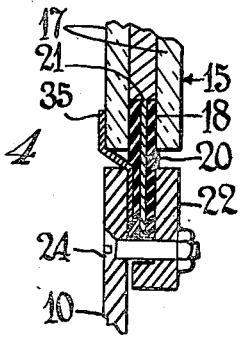
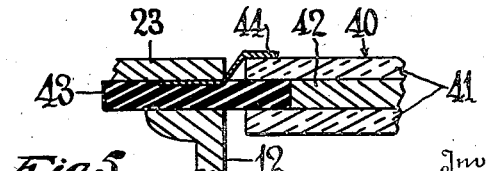
Inventor
DANIEL T. DOWNES
By Olen E. Bee
Attorney Patented Jan. 1, 1946

2,392,129

UNITED STATES PATENT OFFICE 2,392,129

LAMINATED GLASS CLOSURE UNIT

Daniel T. Downes, Creighton, Pa., assignor to Pittsburgh Plate Glass Company, Allegheny County, Pa., a corporation of Pennsylvania Application April 23, 1943, Serial No. 484,188

3 Claims. (Cl. 189—64)

This invention relates to transparent closure structures and it has particular relation to such structures in which laminated glass units are flexibly mounted in wall sections without clamping the glass portions of the units.

One object of the invention is to provide an improved closure structure in which laminated glass is connected to surrounding frame elements by flexible deformable joint-forming means adapted to adhere more tenaciously to the glass than resins will adhere to such glass.

Another object of the invention is to provide an improved closure structure embodying a laminated glass unit in which flexible edge extensions are included with mounting elements adapted to sustain the laminated unit in an opening of a wall section.

Another object of the invention is to provide an improved means for mounting and bracing a laminated unit in a surrounding frame structure that supports such unit.

In the drawing:

Fig. 1 is a fragmentary side elevation of a wall section including a laminated closure structure as viewed from the inside of a compartment or other enclosure in which the structure is adapted to be installed; Fig. 2 is a fragmentary horizontal section, on a larger scale, taken substantially along the line II—II of Fig. 1; Fig. 3 is a fragmentary horizontal section similar to Fig. 2 and in which additional elements are included; Fig. 4 is a fragmentary vertical section on a larger scale taken substantially along the line IV—IV of Fig. 1, but with an additional element included; Fig. 5 is a fragmentary horizontal section similar to Fig. 3 of another form of structure adapted to be included in a wall section of the type shown in Fig. 1; and Fig. 6 is a fragmentary plan taken from outside the compartment and centrally of the two closure units shown in Fig. 1.

In practicing the invention, a wall section 10 which can be a part of an airplane compartment, vehicle, or other structure, is provided with openings 11 separated by a frame member or pier 12 that is rigidly mounted in, and forms a part of, the wall section. A laminated unit 15 is disposed in each opening and comprises a sheet interlayer 16 of organic plastic, such as vinyl acetal resin, or other resin that is adapted to be employed in laminating glass. Plates of glass 17 are bonded upon opposite sides of the interlayer. The edges of the glass plates extend beyond the edges of the interlayer and define therewith a marginal channel 18 in which rubber compound 20 in strip form is mounted in such manner as to extend as a flexible mounting flange entirely around the laminated unit. The rubber is applied upon opposite sides of a metal strip 21 which is coextensive with the rubber. By utilizing a process known as "cycle welding," the surfaces of the rubber are bonded to the opposing faces of the glass plates inside the channel 18. The strip rubber is also bonded to opposite sides of the central metal strip 21 and its inner edges are bonded to the edges of the interlayer 16. Rubber connections of this character provide a much stronger bond than that capable of attainment in adhering resinous interlayer material to the glass in laminated units.

The rubber is sufficiently pliable, flexible, and deformable to serve as a fluid-tight gasket when it is clamped, together with the included strip metal 21, between frame members 23 and 12 along adjacent edges of the laminated units 15, and between the frame members 22 and the wall section 10 along the other edges of the units. Bolts 24 and 25 secure the frames 22 and 23, respectively, in this structure.

A channel 26 is formed longitudinally in the pier 12 which can be composed of aluminum, duralumin, or other material employed in building aircraft or other structures. Inwardly turned flanges 29 of the pier define the upper portion of the channel which receives between such flanges a series of oblong bars 30 which serve as nuts. After insertion lengthwise between the flanges, the bars 30 can be turned crosswise in the channel and tightened upon the inside surfaces of the flanges 29 by manipulating the bolts 25. Adjacent coplanar portions of the strip rubber 20 of the two units 15 are confined between the clamping frame member 23 and the inwardly turned flanges 29 of the pier 12. The frame members 22 and bolts 24 in the same manner clamp the other edges of the rubber and the wall section in fluid-tight relation.

Since the rubber 20 is deformable, resilient and tough, great pressure can be exerted thereon to insure efficient sealing, as well as to constitute a flexible connection between the laminated unit and the surrounding wall section. The edges of the glass plates 17 are spaced from the edges of the surrounding frame structure to provide for proper flexibility of the joint between the frame and laminated units.

In the form of structure shown in Figs. 3 and 4, an additional strip of metal 35, such as thin stainless steel, is flanged in opposite directions longitudinally and in such manner as to fit with one marginal portion resting flat upon the outer side of the outer glass plate 17 and an inner marginal portion in contact with the strip rubber 20. The assembled rubber and strip are clamped between the frame elements by means of the bolts and frame members in the manner described above. This angular strip 35, which constitutes an abutment around the edges of the glass, has been found to add materially to the strength of the laminated unit with respect to the amount of fluid pressure it will withstand.

In Fig. 5 a laminated unit 40 composed of glass plates 41 and interlayer material 42 of organic plastic is constructed essentially the same as that described above with the exception that rubber 43 corresponding to the rubber 20 is not reinforced by an intermediate strip of metal. An abutment strip 44 of metal corresponding to the strip 35 is employed in this arrangement.

Although illustrative forms of the invention have been shown and described in detail, it will be apparent to those skilled in the art that the invention is not so limited but that various changes can be made therein without departing from the spirit of the invention or from the scope of the appended claims.

I claim:

1. In a closure structure, a sheet interlayer of organic plastic, glass plates bonded to opposite sides of the interlayer and having their edges extending beyond the edges of the interlayer to define a channel between said plates along their marginal portions, rubber compound in strip form having inner marginal portions bonded to opposed surfaces of the glass plates in said channel and having a rubber to glass bond materially stronger than the plastic to glass bond, said rubber compound including marginal portions extending beyond the plates for clamping between mounting frame members, and a strip of metal angular in cross section having an edge portion overlapping the outside marginal portion of one of said glass plates and an inner marginal portion contacting along the surface of the rubber in position to be clamped thereagainst, and means for clamping the assembled strip rubber and strip metal in a frame structure.

2. A laminated unit comprising a sheet of adhesive plastic interlayer material, glass plates adhered to opposite sides of said sheet, the edges of the glass plates extending beyond the edges of the interlayer material and defining therewith a channel between the marginal portions of the glass plates, a strip of metal having its inner marginal portion disposed in said channel between the marginal portions of the glass sheet and having its outer marginal portion projecting beyond the edges of the glass sheets, rubber composition layers bonded to the marginal portions of the glass plates inside said channel and having a rubber to glass bond materially stronger than the plastic to the glass bond, said rubber layers being bonded to opposite sides of said metal strip inside and outside said channel, a second strip of metal disposed in overlapping relation along the outside marginal surface of one of said plates and having its outer marginal portions disposed against the adjacent layer of rubber composition, and means for clamping the outer marginal portions of the metal strips and rubber layers in fluid-tight relation at a location spaced from the glass edges.

3. In a closure structure, a sheet of adhesive plastic interlayer material, glass plates adhered to opposite sides of said sheet, the edges of the glass plates extending beyond the edges of the interlayer material and defining therewith a channel between the marginal portions of the glass plates, a strip of metal having its inner marginal portions disposed in the channel between the marginal portions of the glass sheet and having its outer marginal portions projecting beyond the edges of the glass sheets, rubber composition layers bonded to the marginal portions of the glass plates inside the channel and having a rubber to glass bond materially stronger than the plastic to glass bond, said rubber composition layers also being bonded to opposite sides of said metal strip inside and outside said channel, and means for supporting the structure thus formed in clamping relation upon the combined rubber and metal beyond the edges of the glass.

DANIEL T. DOWNES.